Jan. 7, 1969    W. H. STRAUSSER    3,420,547
ANTI-JACKNIFE DEVICE FOR TRACTOR-TRAILER VEHICLES
Filed Aug. 22, 1966
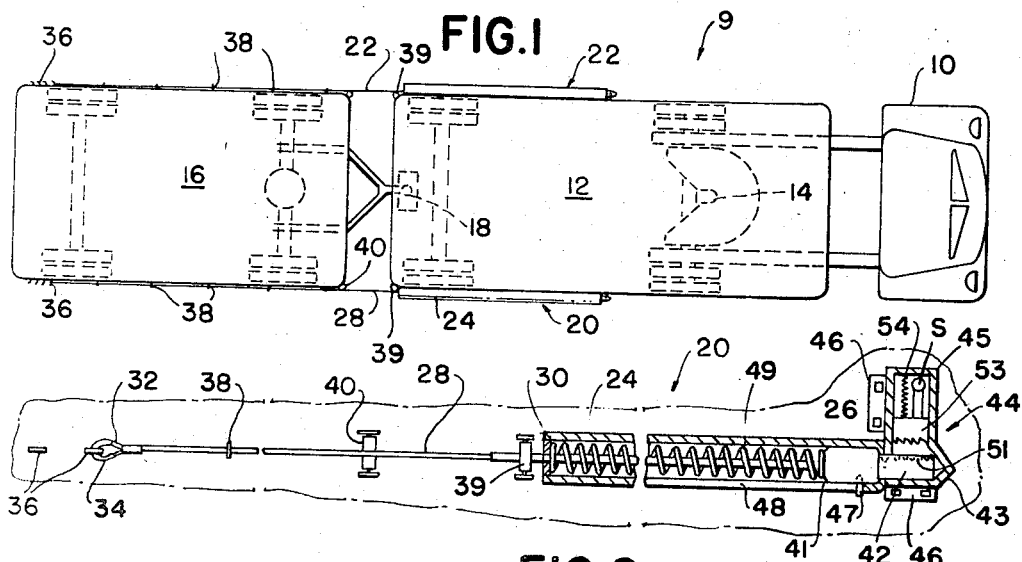
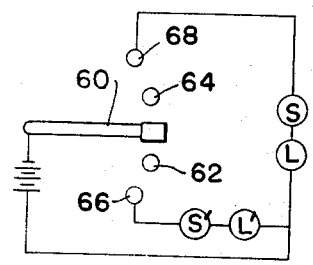
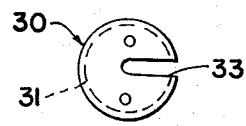
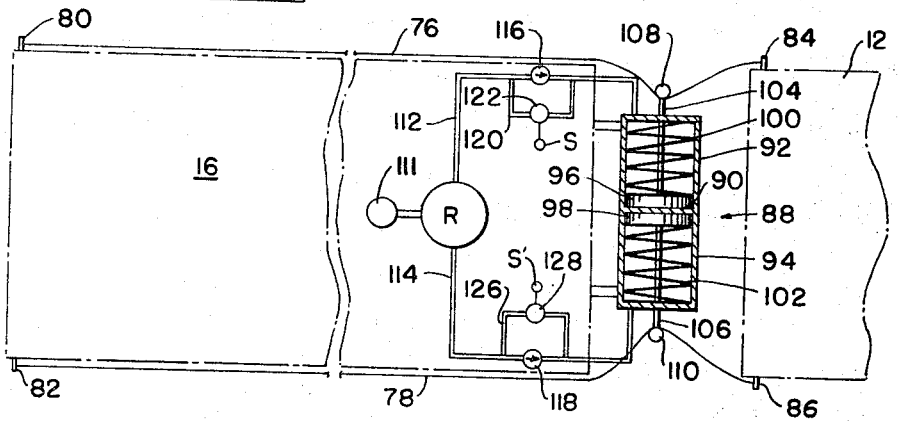
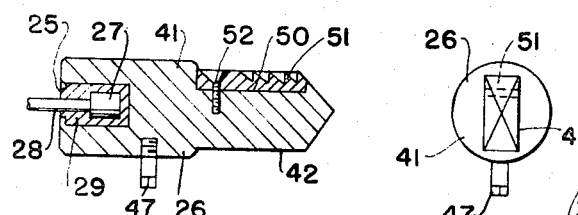
INVENTOR.
WILLIAM H. STRAUSSER
BY
Whittemore, Hulbert & Belknap
ATTORNEYS

United States Patent Office 3,420,547
Patented Jan. 7, 1969

3,420,547
ANTI-JACKKNIFE DEVICE FOR TRACTOR-TRAILER VEHICLES
William H. Strausser, 5082 Parker, Apt. 9, Detroit, Mich. 48213
Filed Aug. 22, 1966, Ser. No. 574,209
U.S. Cl. 280—432        5 Claims
Int. Cl. B62d 53/06

ABSTRACT OF THE DISCLOSURE

Apparatus for preventing jackknifing between a towing vehicle and a towed vehicle upon application of the brakes comprising a flexible linear member along each side of the vehicles and connected at their ends to the two vehicles, with means for selectively releasing one of the linear members or the other to enable the vehicles to negotiate a turn.

---

This invention relates generally to tandem or tractor-trailer type vehicles and refers more particularly to anti-jackknifing devices for such vehicles.

One object of this invention is to provide improved means for preventing jackknifing between a towing vehicle and a towed vehicle when the brakes are applied.

Another object of the invention is to provide a safety device to prevent jackknifing which is normally operative to maintain the towed vehicle in a straight line condition behind the towing vehicle but which may be released when desired, as for the purpose of backing up or making a relatively abrupt turn, for example.

Another object is to provide an anti-jackknifing device which may be released when it is desired to make an abrupt turn by the operation of the usual direction signal stick.

Another object is to provide means associated with the usual directional signal stick located in the operator's cab, which is effective to release the anti-jackknifing means in response to the movement of the directional signal stick beyond its usual position signifying that a turn is to be made. Accordingly, when relatively small angle turns, that is turns involving only a small departure from the straight ahead course of travel, are to be made the directional signal stick will be moved in the appropriate direction to a first position to operate the usual flashing lights, but when large angle turns, that is turns involving a substantial departure from the straight ahead course of travel, are to be made the directional signal stick will be moved in the same direction but farther to a second position not only to operate the flashing lights but also to release the anti-jackknifing means to permit the tandem vehicle to negotiate the turn.

Another object is to provide an anti-jackknifing means of the mechanical type.

Another object is to provide an anti-jackknifing means of the hydraulic type.

Other objects and features of the invention will become apparent as the description proceeds, especially when taken in conjunction with the accompanying drawings, illustrating a preferred embodiment of the invention, wherein:

FIGURE 1 is a plan view of a tractor, semi-trailer, and four-wheel trailer showing the anti-jackknifing means of my invention between the semi-trailer and the four-wheel trailer.

FIGURE 2 is a fragmentary side elevational view, with parts in section, showing the anti-jackknifing means.

FIGURE 3 is a diagram illustrating the control for releasing the anti-jackknifing means.

FIGURE 4 is a fragmentary view of a modification of the invention.

FIGURE 5 is an enlarged sectional view of the head forming a part of the anti-jackknifing means.

FIGURE 6 is an end view of the structure in FIG. 5.

FIGURE 7 is an end view of the slotted wall or plug through which the cable extends as illustrated in FIGURE 2.

Referring now more particularly to the drawing, and especially to FIGURES 1–3, the vehicle there illustrated is generally designated 9 and includes a tractor 10, a semi-trailer 12 having a pivotal connection 14 to the tractor permitting relative angular movements between the two as when the vehicle is negotiating the turn, and a four-wheel trailer 16 pivoted at 18 to permit relative angular movements between the semi-trailer 12 and the four-wheel trailer 16. The anti-jackknifing means is in the form of a dual system, the system on one side of the vehicle being generally designated 20 and the system on the opposite side of the vehicle being generally designated 22. The systems 20 and 22 are identical and accordingly only the system 20 will be described.

Referring to FIGURES 1 and 2, the system 20 includes an elongated horizontal cylindrical tube 24 rigidly secured to a side of the semi-trailer 12. The tube 24 provides a housing for the head 26 which is secured to the forward end of a cable 28. The head has a rear cavity 25. A head 27 brazed or otherwise secured on the end of the cable extends into the cavity and is permanently secured therein by lead 29, or a like substance filling the cavity. The rear end of the tube 24 is closed by a wall or plug 30. The plug 30 is provided with external threads 31 and is threaded into the internally threaded end of the tube 24. The wall or plug 30 is provided with a generally radially extending slot 33 on one side thereof as best illustrated in FIGURE 7 in order that the cable assembly 28 may be easily installed and efficiently maintained. The rear end of the cable has a closed loop or eye 32 which preferably is lined with a metal U-shaped shoe 34 to save wear. The eye 32 is engaged over any one of a longitudinally spaced series of hooks 36 along the side of the four-wheel trailer 16 at the rear end thereof. Eyes or loops 38 secured along the side of the four-wheel trailer 16 serve to guide and support the cable, and a vertically disposed freely rotatable roller 40 is secured to the four-wheel trailer 16 at the front corner thereof to engage the cable and prevent it from rubbing on the corner. Rollers 39 secured to the semi-trailer prevent the cable from binding when it moves into and out of the rear end of the tube 24.

The head 26 has an enlarged body portion 41 which is cylindrical and slides longitudinally within tube 24. The front end of the tube is open so that the reduced forwardly projecting extension 42 of the head may project beyond the front end of the tube to the position shown in FIG. 2. In this position, the extension 42 extends into the lower portion 43 of the housing 44 for the locking mechanism. The upper portion of this housing is designated 45, and the two housing sections may be secured to the semi-trailer by brackets 46. The head 26 has a pin 47 which projects downwardly into an elongated longitudinally extending slot 48 in the tube so as to prevent the head 26 from rotating. A compression coil spring 49 bears at one end against head 26 and at the opposite end bears against the rear wall 30. Hence the coil spring 49 urges the head 26 to the right in FIGURE 2, or forwardly to the position shown.

In the event it is necessary at any time to increase the tension of spring 49, plug or wall 30 is unthreaded from the tube 24 and one or more spacers or washers are interposed between the wall 30 and spring 49. The spacers or washers are provided with radially extending slots, like the plug slot 33, in order to insert such spacers around the cable 28. After the spacers or washers have been installed around the cable 28, the plug or wall 30 is threaded into the tube 24, with the washers inside of the tube 24 between plug 30 and spring 49.

The head 26 is shown in FIGURE 2 in its forward position, but with the locking means released so as to permit the rearward movement of the head. When the head is locked in this position, the cable is held taut to prevent jackknifing or sidewise movement of the four-wheel trailer 16 relative to the semi-trailer 12. The extension 42 of the head has an elongated slot 50 in its top surface extending longitudinally thereof, and a rack 51 is secured in the slot by fastener means 52. It will be noted that the front surfaces of the upwardly facing teeth on the rack are vertical and the rear surfaces are inclined as illustrated in FIGURE 5. The rack is positively held against longitudinal movement with respect to the head by end surfaces of the slot 50. The extension 42 is rectangular as shown and is pointed at the forward end. The lower portion 43 of housing 44 is shaped to slidably received extension 42. The upper portion 45 of the housing communicates with the lower portion and vertically slidably supports a locking member 53. The locking member 53 has rack teeth on the bottom, the rear surfaces of which are vertical and the front surfaces of which are inclined. The locking member 53 is adapted to be moved downwardly by springs 54 to its lower limit in which its teeth engage the teeth of rack bar 51. The teeth of locking member 53 when engaged with the teeth of the rack bar 51 secured to extension 42 will prevent rearward movement of the head 26. However, the head 26 can move forwardly with respect to the locking member 53 by camming across the teeth thereof.

The spring 54 urges locking member 53 downwardly, and solenoid S when energized retracts the locking member 53 against the action of spring 54 to the FIGURE 2 position. When the member 53 locks the head 26 in the forward position, the cable is held taut. Accordingly, the four-wheel trailer 16 is held in a straight line position with respect to the semi-trailer 12 against sidewise movement in one direction.

The other anti-jackknifing system 22 of course prevents relative angular movement of the four-wheel trailer in the opposite direction.

When it is desired to make a turn of 90 degrees or at least a turn of a substantially abrupt angle, the head 26 may be released to free the head and in effect permit the cable 28 to stretch and thereby permit relative angular movement of the trailer 16. In order to free the head 26, the movable locking member 53 is raised to a position clear of the head, and accordingly when the vehicle goes around a turn, the head 26 can move rearwardly in the tube 24 against the action of compression spring 49 to permit cable 28 to develop enough slack to permit the turning movement. The cable will not rub or bind in a front corner of the trailer by reason of the roller 40. Rollers 39 assure that the cable will pull out of the tube straight without binding.

When the vehicle pulls out of the turn and returns to a straight course of travel, the compression spring 49 will return the head 26 to the position shown in FIGURE 2 whereupon it will be re-locked in the forward or operative position to cause the anti-jackknifing system 20 to again become operative.

The means by which the anti-jackknifing system 20 may be rendered inoperative to make a turn will now be described. Referring to FIGURE 3, the usual turn signal stick 60 which is mounted in the cab of the tractor 10 for use by the operator when he desires to make a turn. As is customary, when he wishes to make a turn to the right he will move the stick 60 clockwise to contact terminal 62 thereby causing the usual flashing lights front and rear on the vehicle to indicate to other motorists that a turn will be made to the right. When he wishes to turn left, he will move the turn signal counter-clockwise to contact terminal 64. The operator will operate the turn signal stick in this manner when relatively small angle turns are being made, or, for example, when he wishes to pull out of his lane to pass another vehicle. Such operation of the turn signal stick will not release the anti-jackknifing means since enough slack or play is usually present in the system to make it unnecessary to do so.

However, when the operator wishes to make a relatively large angle turn, and wishes to release one of the anti-jackknifing systems 20, 22 to permit the turn to be negotiated, he will move the turn signal stick farther so as to contact either of terminals 66 or 68. For example, if he wishes to turn left, he will move the stick 60 to terminal 68 thereby completing a circuit through the turn signal stick 60 to solenoid S. When energized, solenoid S is operative to retract or elevate the movable locking member 53 to the FIGURE 2 position to clear the head 26 and free the same for rearward movement. When the solenoid S is de-energized, the spring 54 will return the movable locking member 53 to the operative position in engagement with rack 51 of extension 42 of the head.

Oftentimes the solenoid S will be de-energized before the vehicle has returned completely to a straight course of travel, in which event the movable locking member 53 will have returned to its lower operative position prior to the head. Accordingly, upon forward movement of the head 26 to its normal position by the action of spring 49 when the vehicle is coming out of the turn, the head 26 will cam past the teeth of movable locking member 53, moving the latter upwards slightly.

It will be noted that there is a light L which may be a green light in circuit with the solenoid S. The light L will be in the operator's cab to indicate to him that the corresponding anti-jackknifing system has been released and that therefore he may make a relatively abrupt turn without interference from the system.

Obviously, if a turn in the opposite direction is to be made, the signal stick 60 will be moved beyond the terminal 62 to contact terminal 66 completing a circuit to a solenoid S′ used with the anti-jackknifing system 22. It will also be noted that there is a similar light L′ in the circuit to the solenoid S′ (which is incorporated in system 22 in the same manner solenoid S is used in system 20) to indicate to the driver in the cab that the corresponding anti-jackknifing system has been released so that he can make the turn without interference from that system.

When a right turn is to be made, the system 22 is rendered inoperative by the manipulation of the turn signal switch described, and when a left turn is to be made, the system 20 is rendered inoperative.

FIGURE 4 illustrates a modification of the invention. The semi-trailer 12 and the four-wheel trailer 16 are connected together in the same manner as in the first embodiment to permit a relative angular side movement of the two vehicles, the pivotal connection being omitted here because of the semi-diagrammatic nature of the view illustrating the anti-jackknifing mechanism. In this embodiment, the ends of the cables 76 and 78 are connected to brackets 80 and 82 secured to the rear of trailer 16 and are also connected to brackets 84 and 86 at the rear of semi-trailer 12.

Secured to the front of the four-wheel trailer 16 is a dual hydraulic cylinder 88 having a center partition 90 separating it into two cylinders 92 and 94. Pistons 96 and 98 are reciprocable within the cylinders being normally urged to the position illustrated in contact with the center partition 90 by the compression springs 100 and 102. Connecting rods 104 and 106 extend from the pistons through the end walls of the cylinders and have pulleys 108 and 110 on the outer ends thereof around which the cables 76 and 78 extend. In usual straight ahead travel of the vehicle, the cables 76 and 78 are held substantially taut by the pistons, although not straight because they curve under the pulleys 108 and 110.

The cylinders 92 and 94 are filled with oil and are connected to a reservoir R through hydraulic lines 112 and 114. Line 112 has a check valve 116 therein which permits a flow of oil only towards the cylinder 92 as indicated by the arrow, and check valve 118 in line 114 permits a flow of oil only towards the cylinder 94 as indicated by the arrow. There is a bypass conduit 120 around check valve 116 which has a normally closed valve 122 therein and is opened by a solenoid S when the latter is operated. There is also a bypass conduit 126 around check valve 118 having a normally closed valve 128 therein which is opened by the operation of a solenoid S. A pressure means, such as an air pump, designated 111, is provided to pressurize the reservoir R and force oil from the reservoir into cylinders 92 and 94 when the valves permit, to keep the cylinders full.

In normal operation, as already stated, the cables 76 and 78 are substantially taut. The pistons are in the positions illustrated and in fact cannot move from such positions. Check valves 116 and 118 prevent flow away from the cylinders, and the normally closed valves 122 and 128 are closed. However, when it is desired to make a turn one of the valves 122, 128 is opened to permit a return flow of oil from the associated cylinder 92 or 94 thereby allowing the associated piston to move outwardly and to produce slack in the corresponding cable. For example, if a right turn or sharp angle turn is to be negotiated, the cable 76 will require some slack. For this purpose, the solenoid S will be operated to open the valve 122 and permit a return flow of oil to the reservoir from cylinder 92. In order to accomplish this, the turn signal stick 60 (FIG. 3) will be moved to contact 66. In this position, terminal 66 will not only cause a flashing of the turn signal lights on the right side of the vehicle but will also effect an energization of the solenoid S to render the anti-jackknifing means on the left side of the vehicle inoperative. Obviously, when a left hand turn is negotiated the anti-jackknifing means on the right side of the vehicle must be rendered inoperative and for this purpose the solenoid S' is energized. It should be clear from the foregoing description that the turn signal stick will be moved in the appropriate direction to indicate a left hand turn, that is counter-clockwise, beyond the usual position to a position in which it engages the second contact 68.

The invention as thus deescribed, in both its forms, is effective during normal straight ahead travel of a vehicle to prevent jackknifing. This is accomplished by the provision of substantially taut cables along both sides of the vehicle making it impossible for the vehicles, that is the semi-trailer and four-wheel trailer, to move angularly in a sidewise direction relative to one another. However, when sharp or abrupt turns need to be negotiated, one anti-jackknifing system or the other may be rendered inoperative by the convenient use of the usual directional turn signal stick.

It will be understood, of course, that a similar anti-jackknifing means may be provided between the tractor and semi-trailer if desired. The invention has been illustrated and described, however, as being applied to the semi-trailer and four-wheel trailer where it has been indicated by experience that the anti-jackknifing system of the present invention is more urgently needed. It will be appreciated that when the anti-jackknifing means is used on the units 10 and 12, the systems 20 and 22 are reversed end for end from the position shown in FIGURE 1.

What I claim as my invention is:

1. Apparatus for preventing jackknifing between a towing vehicle and a towed vehicle upon application of the brakes, comprising a flexible linear member along each side of said vehicles extending longitudinally thereof, means for holding said members in a taut operative condition, including means for connecting one end of each member to one of said vehicles and releasable means for connecting the other end of each member to the other of said vehicles, releasing means having separately operable mechanism for releasing one of said releasable means or the other, the other of said vehicles having guide means on opposite sides thereof, said guide means comprising elongated horizontal tubes, said other ends of said members having enlarged heads slidable in said tubes upon release of said releasable means, said releasable means being located at one end of each tube, spring means urging each head to said one end of its tube, a directional signal stick on said towing vehicle to signal a turn, said signal stick being capable of movement in both directions beyond the usual turn-signalling positions to positions in which it not only signals a turn but also operates one releasing mechanism or the other.

2. Apparatus for preventing jackknifing between a towing vehicle and a towed vehicle upon application of the brakes, comprising a flexible linear member along each side of said vehicles extending longitudinally thereof, means for holding said members in a taut operative condition, means for releasing the holding means for each member, and a directional signal stick on said towing vehicle to signal a turn, said releasing means being operated in response to operation of said directional signal stick wherein said signal stick is capable of movement in both directions beyond the usual turn-signalling positions to positions in which it not only signals a turn but also operates the releasing mechanism for one holding means or the other.

3. Apparatus for preventing jackknifing between a towing vehicle and a towed vehicle upon application of the brakes, comprising a flexible linear member along each side of said vehicles extending longitudinally thereof, means connecting one end of each member to one of said vehicles, elongated horizontal guide tubes on opposite sides of the other of said vehicles extending longitudinally thereof, heads on the opposite ends of said members slidable respectively in said tubes, spring means in said tubes urging said heads longitudinally thereof in a direction to tension said members, releasable means associated with each tube and operative to lock the associated head against movement in a direction to release the tension on the associated linear member, and means selectively operative to release one of said releasable means or the other to free the associated head and enable the vehicles to negotiate a turn without interference from the associated linear member.

4. The apparatus defined in claim 3, wherein said selectively operative means includes a directional signal stick on said towing vehicle.

5. The apparatus defined in claim 3, wherein said selectively operative means includes a directional signal stick on said towing vehicle capable of movement in both directions beyond the usual turn-signalling positions to positions in which it not only signals a turn but also releases one of said releasable means or the other.

References Cited

UNITED STATES PATENTS 2,838,325   6/1958   Begin _____ 280—432
2,918,309   12/1959   Cellucci _____ 280—432

BENJAMIN HERSH, *Primary Examiner.*

J. E. SIEGEL, *Assistant Examiner.*